United States Patent [19]

Nelson et al.

[11] Patent Number: 5,728,202
[45] Date of Patent: Mar. 17, 1998

[54] GILSONITE MODIFIED, NATURAL, HYDROCARBON-ENRICHED SAND COMPOSITION

[75] Inventors: Roy E. Nelson, Salt Lake City; Michael Nuzzolo, Bountiful; Kenneth Clark Christensen, Centerville, all of Utah

[73] Assignee: American Gilsonite Company, Salt Lake City, Utah

[21] Appl. No.: 712,324

[22] Filed: Sep. 11, 1996

[51] Int. Cl.$^6$ .................... C08L 95/00; C09D 195/00; C10G 1/04
[52] U.S. Cl. .................... 106/284.01; 106/281.1; 208/390
[58] Field of Search .................... 106/284.01; 208/281.1, 208/390

[56] References Cited

U.S. PATENT DOCUMENTS 5,196,058  3/1993  Merrell .................... 106/278

OTHER PUBLICATIONS

"Trinidad Lake Asphalt 4", D. C. Broome, Wells Ltd., London, England.

"Asphalts and Allied Substances", Herbert Abraham, Historical Review and Natural Raw Materials, vol. One, D. VanNostrand Company, Inc., Princeton, New Jersey, pp. 164 and 221.

*Primary Examiner*—David Brunsman
*Attorney, Agent, or Firm*—Mallinckrodt & Mallinckrodt

[57] ABSTRACT

Tar sand and Gilsonite are preferably crushed together so that the Gilsonite overcomes the stickiness of the tar sand and the tar sand alleviates Gilsonite dust, the relative proportions and the character of Gilsonite being such as to produce an additive product for an asphalt, usually refinery asphalt, and a resulting modified asphaltic cement for paving purposes to simulate Trinidad Lake Asphalt. One embodiment of the additive composition of the invention results in an asphaltic cement that outperforms that produced by use of Trinidad Lake Asphalt as the additive, while a second embodiment of the additive composition of the invention contains additional tar-sand-extracted bitumen and the resulting asphaltic cement more closely matches the performance of that containing Trinidad Lake Asphalt as the additive. The invention includes a system for extracting bitumen from tar sand and in one form provides for adding Gilsonite to the extracted liquid bitumen so it will effectively solidify when cooled.

17 Claims, 2 Drawing Sheets

5,728,202

GILSONITE MODIFIED, NATURAL, HYDROCARBON-ENRICHED SAND COMPOSITION

BACKGROUND OF THE INVENTION

1. Field

The invention is in the field of bitumen materials as used primarily for asphalt paving purposes.

2. State of the Art

Natural asphalts have long been used in the paving of roadways, including high speed automotive highways. It was found many years ago that an asphaltic material occurring naturally as a large lake on the Caribbean island of Trinidad and made up of bitumen containing a filler material consisting of small particles of rock or sand, much of it in colloidal form, provides a long wearing and effective material for road surfacing. Today, such Lake Asphalt is commonly mixed as an additive with an asphalt, usually obtained as a by-product of petroleum refining, to provide a modified asphaltic composition known as "asphaltic cement" for paving purposes. Heretofore, there has been no acceptable substitute for such Trinidad Lake Asphalt for paving or other purposes, even though attempts have been made by adding sand and other materials to petroleum-derived asphalts.

Other attempts have been made to pave with mixtures of natural hydrocarbon-enriched sand, i.e. so-called "tar sand", and a natural asphaltite material, "Gilsonite", but with limited success.

SUMMARY OF THE INVENTION

A principal objective in the making of the present invention was to provide an acceptable substitute for Trinidad Lake Asphalt that would serve the same purposes and be substantially as effective, if not more so.

In achieving this objective, we have found that by mixing a natural tar sand, especially that found in the Uintah Basin, Uintah County, State of Utah, with a proper proportion of Gilsonite, as also found in the Uintah Basin of Utah and selected from the standpoint of physical characteristics that will effectively modify such characteristics of the natural tar sand, and that, by fine-sizing both such materials, preferably done so together so that the Gilsonite will alter the stickiness of the tar sand and the tar sand will alleviate the Gilsonite dust, a final product is obtained that is actually superior to Trinidad Lake Asphalt as a natural additive composition for modifying a paving asphalt, especially the many forms of refinery asphalt normally used for paving purposes.

It was also found that, by mixing with the aforesaid additive composition a natural bitumen extracted from tar sand, a second embodiment of additive composition is obtained that closely matches Trinidad Lake Asphalt from the standpoint of performance of asphaltic cement resulting from its use in modifying paving asphalt.

In accordance with the apparatus aspect of the invention and the method employed in using the apparatus, we provide a system employing a solvent extraction column through which the tar sand is run, there being a body of water maintained in the lower end portion of the extraction column for washing the sand before its discharge from the system, a separator for removing residual sand and water from the solvent-carrying bitumen, and equipment for separating solvent from the extracted bitumen, through all of which the material flows on a continuous basis. In the use of such system, it has been found that the Gilsonite can be blended with the extracted liquid bitumen before its discharge from the system and that the mixture of Gilsonite and extracted bitumen can be cooled to an easily handled solid for mixing with additional tar sand to provide the aforesaid second embodiment of the additive product of the invention.

BRIEF DESCRIPTION OF THE DRAWINGS

Best modes presently contemplated for carrying out the invention are illustrated in the accompanying drawings, in which.

DETAILED DESCRIPTION OF THE ILLUSTRATED PROCEDURE AND APPARATUS

Figure 1:
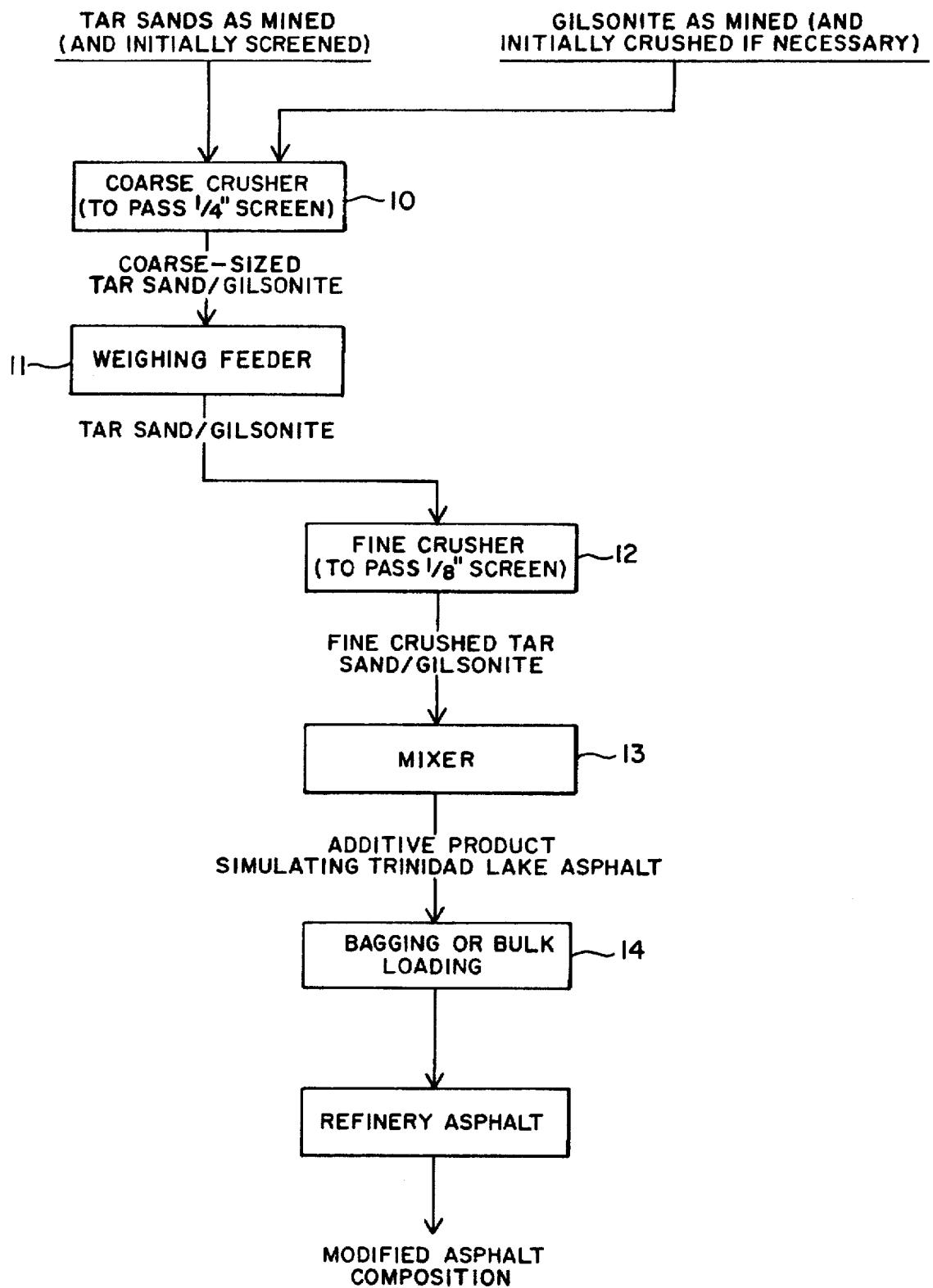
FIG. 1 is a block diagram representing preferred procedure for producing from a tar sand and Gilsonite a first embodiment of the invention constituting a new additive composition simulating Trinidad Lake Asphalt but providing a modified asphaltic cement composition that actually exceeds, in performance characteristics, an asphaltic cement produced by the addition of Trinidad Lake Asphalt to a paving asphalt, usually refinery asphalt.

It has been found by us that an additive composition simulating Trinidad Lake Asphalt, but actually exceeding it in providing better performance characteristics for the asphaltic cement made from it, is produced by the procedure indicated in FIG. 1.

Thus, a natural tar sand, wherever found but conveniently and preferably being that which is mined not far from the City of Vernal in the Uintah Basin, Utah, is initially screened to eliminate large rocks and debris and then introduced, along with Gilsonite, into coarse crushing equipment, such as a standard roll crusher, the discharge being screened through preferably a one-quarter inch screen, with recirculation of rejects to the crusher, the resulting coarsely crushed material being passed to weighing feeder equipment.

Weighed amounts of the coarsely crushed tar sand and Gilsonite are passed from the weighing feeder to fine crushing equipment, such as a standard hammer mill, the discharged Gilsonite-carrying tar sand being passed through preferably a one-eighth inch sizing screen, again with return of rejects to the crusher, the resulting finely crushed tar sand and Gilsonite material being passed to mixing equipment, such as a standard pug mill.

The Gilsonite is selected for physical characteristics which will effectively modify those of the tar sand. We have found that these characteristics are largely determined by ascertaining the softening or fusing point of the particular Gilsonite as mined from various locations. After preliminary crushing, if necessary, the selected Gilsonite is passed to the coarse crushing equipment and then to and through the fine-crushing equipment, preferably along with the tar sand which is rendered non-sticky by the Gilsonite so as to be easily handled. In turn, Gilsonite dust is alleviated by being taken up by the sticky tar sand.

After such fine-crushing, the Gilsonite-carrying tar sand material is passed into the weighing feeder equipment and on through the fine mixer equipment, from where it passes to bagging or bulk-loading equipment as an additive product for mixing with usually a refinery asphalt to produce a final, modified asphaltic cement product for paving purposes. Surprisingly, this asphaltic cement has desired properties superior to those produced when Trinidad Lake Asphalt is used as the additive.

Figure 2:
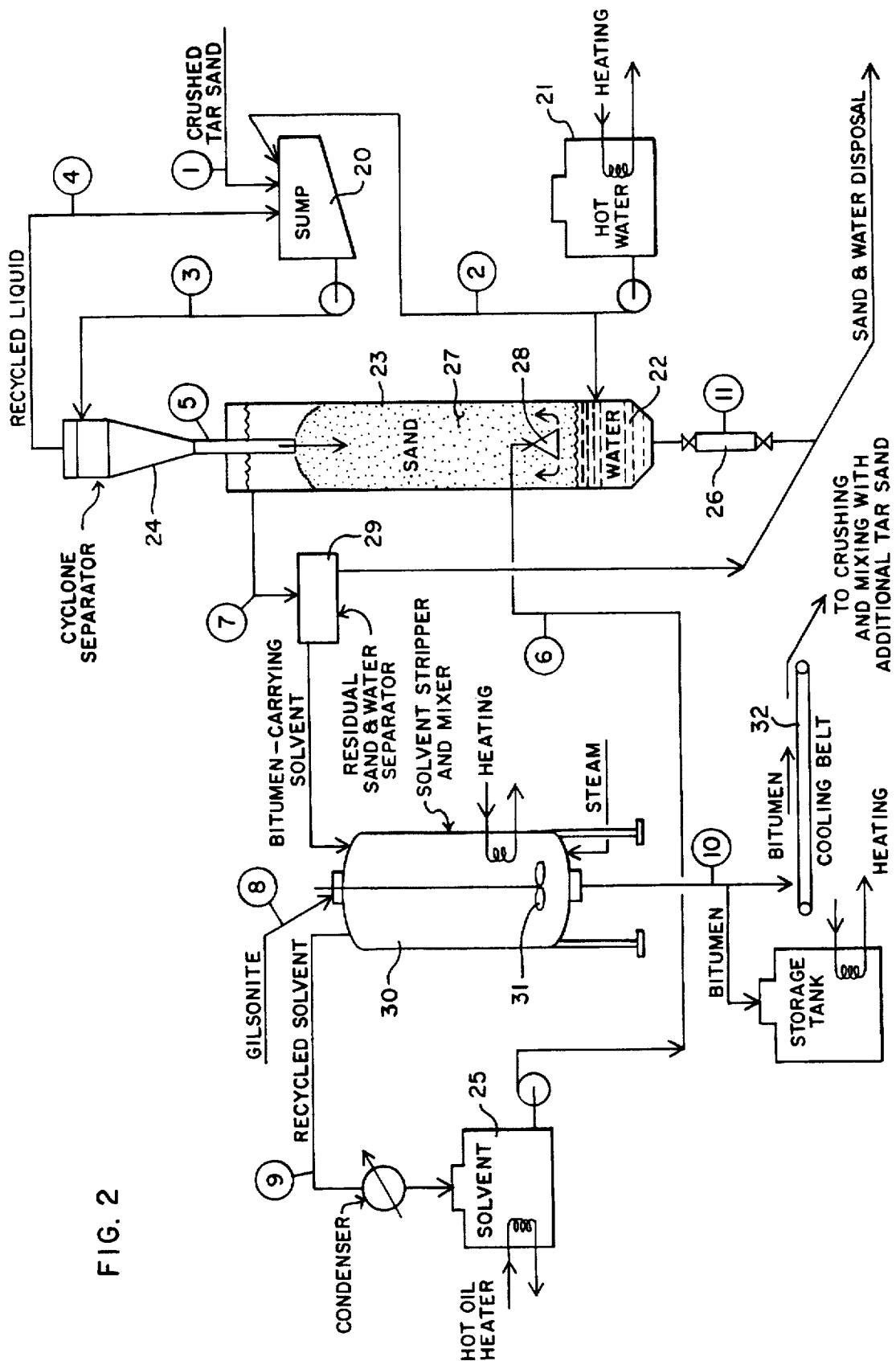
FIG. 2, a schematic representation of a novel solvent extraction system that may be used to continuously extract from tar sand a liquid bitumen material for either mixing with the Gilsonite-carrying, additive composition of FIG. 1 to produce a second embodiment of additive product of the invention that comes reasonably close to matching the performance of a paving asphalt modified by Trinidad Lake Asphalt as the additive, or, preferably, that produces the second embodiment of additive product by mixing Gilsonite with the liquid bitumen before its discharge from the system so that cooling of the mixture puts it in easily handled, solid form.

In FIG. 2 is schematically shown a system of apparatus for continuously extracting bitumen from tar sand. It is used to extract, from tar sand alone, an essentially liquid bitumen for either mixing, as is, with the Gilsonite-carrying additive product of FIG. 1 to provide a somewhat different additive composition constituting a second embodiment of the invention, the sand component being washed free of bitumen by solvent in a countercurrent extraction column and discarded, after passing through a body of water maintained in the lower end portion of the extraction column and discharged therefrom as clean sand for disposal, or the system may be similarly used but with Gilsonite being added to the so-extracted liquid bitumen during a solvent recovery stage to provide an essentially solid, intermediate product for mixing with additional tar sand and crushed therewith to provide the aforesaid second embodiment of the invention which reasonably closely matches Trinidad Lake Asphalt as a paving-asphalt-modifying additive composition. In both instances of use, the feed to the system illustrated in FIG. 2 is solely tar sand. The second use is, however, much preferred for the ease afforded in the handling of the extracted bitumen as a solid rather than as a liquid.

The tar sand fed to the system of FIG. 2 is either coarse or fine crushed, but normally without added Gilsonite. It is fed continuously into the system, as into a sump 20. Preferably, hot water at about 180° F. continuously flows into the sump, as from a hot water tank 21, which also preferably supplies a body of hot water 22 at the bottom of a countercurrent, solvent extraction column 23. A slurry of hot water and tar sand is preferably pumped from sump 20 to separator equipment 24, usually a standard cyclone, from which sand and any other solids present exit into the top of extraction column 23, while the liquid is recirculated to the sump. The tar sand solids pass downwardly through a solvent, usually heptane, which is preferably supplied from a heater tank 25 and passes upwardly countercurrent to the descending sand. Much of the thereby cleansed sand continues to descend through the body 22 of hot water, which removes any residual solvent, the sand then flowing out the bottom of column 23, as through control valving 26, to disposal. Solvent flows into the lower part of the column of descending sand 27, desirably through a rotating nozzle 28 that is directed upwardly within the sand column.

Liquid, comprising solvent-rich bitumen, water, and some residual sand, is continuously drawn off from the upper part of extraction column 23 and is preferably passed through secondary separating equipment 29 for removing residual sand and water from the solvent-rich bitumen, the latter being passed into the upper end of solvent-recovery equipment, such as a solvent stripper tank 30, where heat and steam are used to remove the solvent and light oils from the bitumen. Tank 30 is provided with an impeller 31 for agitating the contents of the tank.

The separated solvent is preferably recycled from the solvent stripper tank back into the system, together with any fresh solvent that might be needed.

In one form of the system of FIG. 2, provision is made for introducing Gilsonite into the solvent stripper tank 30, as indicated, for mixing with the extracted liquid bitumen before its withdrawal from the system. Cooling of the Gilsonite-carrying bitumen solidifies it for easy handling. Cooling may be by discharge of the liquid onto a cooling belt conveyor 32 of the system for transportation to crushing equipment such as that of FIG. 1.

Based on pilot plant operation of the system of FIG. 2, with Gilsonite added to the solvent stripper tank 30, the following is typical:

| | |
|---|---|
| Tar Sand Feed Rate | 8.75 tons/hr (TPH) |
| Bitumen Content (12%) | 1.05 |
| Oil Content (8% of Bitumen) | 0.08 |
| Stripping Oil Ratio (2.5/1) | 3.15 |

Operating conditions at respective locations indicated as 1-11 of the system are approximately:

| LOCATION | 1 | 2 | 3 | 4 | 5 | 6 |
|---|---|---|---|---|---|---|
| TPH SOLIDS | 8.75 | | 8.75 | 0.50 | 8.25 | |
| TPH LIQUID | | 3.75 | 20.00 | 16.25 | 3.75 | 3.15 |
| TPH PULP | | | 28.75 | 16.75 | 12.00 | 3.15 |
| % SOLIDS WT | 100 | | 0.30 | 2.99 | 0.69 | 0.00 |
| SP. GR. PULP | | | 1.50 | 1.05 | 2.15 | 3.15 |
| % SOLIDS VOL | 100 | | 14.10 | 1.10 | 45.20 | |
| U.S. GPM PULP | | 80 | 93.00 | 65.69 | 27.33 | 14.80 |

| LOCATION | 7 | 8 | 9 | 10 | 11 |
|---|---|---|---|---|---|
| TPH SOLIDS | | 0.76 | | | 7.70 |
| TPH LIQUID | 4.20 | | 3.23 | 0.97 | 5.13 |
| TPH PULP | 4.20 | 0.76 | 3.23 | 0.97 | 12.83 |
| % SOLIDS WT | | | | | 60.00 |
| SP. GR. PULP | | | | | |
| % SOLIDS VOL | | | | | |
| U.S. GPM PULP | 19.75 | | 15.20 | 4.20 | 4.28 |

In working with the locally mined tar sand, which varies in bitumen content from about 5% to about 20% and in aggregate content from about 95% to about 80%, both by weight, tar sand having a bitumen content of about 15% and aggregate content of about 85% is normally used along with a grade of Gilsonite whose softening point is about 330° F. to about 360° F. but usually about 340° F. and sized from about 50% to about 60% retained by a 150 mesh screen. However, Gilsonite within the broader range of about 270° F. to about 390° F. could, but usually would not, be used.

Trinidad Lake Asphalt in the crude state is an emulsion of asphalt, water, gas, and mineral matter. Much of the mineral matter is of colloidal dimension dispersed throughout the asphalt. Such Lake Asphalt is refined for use by the removal of water and gas.

When the Trinidad Lake Asphalt, as so-refined, is combined with a paving asphalt as a modifying additive thereto for producing an asphaltic cement composition, such asphaltic cement composition has properties depending upon the grade of the asphalt used and the relative proportions of each of the two ingredients.

With respect to how close the additive products of the invention simulate Trinidad Lake Asphalt, the latter has a particle content that is about 25% greater than 60 microns (200 mesh being 75 microns), while the additive products of the invention each have a particle content about 92% greater than 75 microns.

The first embodiment (No. 1) of the additive product of the invention typically contains, by weight, approximately 43% raw tar sand and approximately 57% Gilsonite. Specific gravity is about 1.3. There is zero penetration at 77° F.

and softening point (Ring & Ball) is within the range of about 325° to about 335° F. Mineral matter reduced to ash is within the range of about 35% to about 39%. As so constituted, tests performed by a well-recognized, independent testing laboratory show that an addition of only 15% of this No. 1 additive product to a standard PG 64-34 refinery asphalt was required to meet the performance grade (PG 82-22) of the resulting asphaltic cement, relative to the addition of 25% of Trinidad Lake Asphalt to meet essentially the same grade of the resulting asphaltic cement (see Example 3 below). Since only 60% of the amount of the No. 1 additive is used relative to the amount of Trinidad Lake Asphalt used to obtain essentially the same performance grade of the asphaltic cement, there is a 40% saving by using the No. 1 additive of the invention.

The second embodiment (No. 2) of the invention typically contains, by weight again, approximately 43% raw tar sand, but only approximately 25% Gilsonite, there being approximately 32% of added bitumen extracted from tar sand. Specific gravity is again about 1.3, but penetration at 77° F. is about 1 to about 4, and softening is about 200° to about 210° F. (Ring and Ball) Mineral matter is again within the range of about 35% to about 39%. As so constituted, corresponding tests performed by the same testing laboratory showed that the use of the No. 2 embodiment of the invention approximately matched that of the Trinidad Lake Asphalt when the quantities used were the same, i.e. a 25% addition to the refinery asphalt.

Following are examples of various tests carried out:

EXAMPLE 1

Comparative tensile strength ratio tests were carried out by the aforementioned testing laboratory to determine resistance to moisture-induced damage to a modified refinery asphalt.

Test samples of a selected refinery asphalt as modified by the addition of equivalent weights of Nos. 1 and 2 and Trinidad Lake Asphalt additives, respectively, to form asphaltic cements, were blended with equivalent amounts of an aggregate and pressed to simulate a road paving situation. From these samples, respective ones were pressed by a ram until they crumbled. The maximum pressures reached before crumbling were recorded as representing dry strength. Respective other ones were immersed in hot water (140° F.) for five days and then subjected to the same pressure testing as were the dry samples. Dividing the wet strength by the dry strength to obtain the tensile strength ratios for the respective samples gave the following results, it being realized that the higher the percentage the more resistant the samples were to moisture-induced damage:

| | |
|---|---|
| No. 1 embodiment | 86.3% |
| No. 2 embodiment | 74.7% |
| Trinidad Lake Asphalt | 62.7% |

EXAMPLE 2

The usual Marshall Mix Testing was done on respective samples by the same testing laboratory to evaluate stability. The samples were compacted in a mold while still hot to provide respective specimen buttons four inches in diameter and two and a half inches thick. Each sample was heated to 140° F. and a lateral surface load was applied by moving a loading head at a constant rate of two inches per minute. The maximum loads reached just before the specimens failed were recorded as the stability of the mixes, the higher the Marshall Values (in terms of pounds) the better:

| Sample | Marshall Values |
|---|---|
| No. 1 embodiment | 4800 pounds |
| No. 2 embodiment | 2580 pounds |
| Trinidad Lake Asphalt | 2960 pounds |

EXAMPLE 3

Testing of respective samples of No. 1 embodiment against Trinidad Lake Asphalt were conducted, again by the same testing laboratory, in accordance with the Strategic Highway Research Program (SHRP) system that has been adopted by many states of the U.S. This system involves testing for both high temperature and low temperature performance, the former carried out by a dynamic shear rheometer which measures at what temperature a specimen becomes susceptible to deformation and the latter by a bending beam rheometer, which measures flexural modules at high temperature, with the following results:

| Sample | |
|---|---|
| | High Temperature Performance |
| No. 1 embodiment | 82.6 C. |
| Trinidad Lake Asphalt | 81.7 C. |
| | Low Temperature Performance |
| No. 1 embodiment | 24.0 C. |
| Trinidad Lake Asphalt | 22.3 C. |

Using the accepted procedure to obtain the percent by weight of the particular additive to a refinery asphalt necessary to show 98% reliability in six centigrade increments between high temperature and low temperature grades of the respective asphaltic cements, it was shown that only 15% of the No. 1 embodiment of the invention was required, while 25% of the Trinidad Lake Asphalt was required, and that of such additions to a refinery asphalt PG 82-22 for the No. 1 embodiment of the invention and PG 76-22 for the Trinidad Lake Asphalt, the former performed somewhat better than the latter.

Although the foregoing explanation of the invention is concerned primarily with the production of asphaltic cements for paving purposes, it is believed that the invention has broader ramifications. Thus, we have found that Gilsonite may be blended with tar sand to form unique products, the blending being engineered to match physical properties of various asphaltic materials. By changing the ratio of Gilsonite to tar sand, the softening point of the ultimate product can be changed, up or down, and the concentration of mineral filler can be adjusted to provide for a wider range of uses than the individual materials by themselves.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. An additive asphaltic composition for modifying a paving asphalt to closely match or exceed performance of a paving asphalt modified by the addition of Trinidad Lake Asphalt, comprising natural tar sand and Gilsonite intimately mixed together in relative amounts by weight, with the Gilsonite being of character selected to effectively modify the characteristics of said tar sand, to thereby approximately simulate Trinidad Lake Asphalt, wherein the tar sand and the Gilsonite are present in relative amounts by weight of about 45% and about 55%, respectively.

2. An additive asphaltic composition according to claim 1, wherein the Gilsonite is binder grade with softening temperature within the range of about 330° F. to and about 360° F.

3. An additive asphaltic composition according to claim 2, wherein the tar sand and Gilsonite are sized to pass a one-eighth inch screen.

4. A modified asphalt for paving purposes, comprising the additive composition of claim 3 mixed with a paving asphalt.

5. A modified asphalt according to claim 4, wherein the paving asphalt with which the additive composition is mixed is a refinery asphalt.

6. A method of producing a modified asphalt for paving purposes, comprising mixing the additive composition of claim 1 with a paving asphalt.

7. The method of claim 6, wherein the paving asphalt is a refinery asphalt.

8. An additive asphaltic composition according to claim 1, wherein the natural tar sand and the Gilsonite are from Uintah County, Utah.

9. An additive asphaltic composition for modifying a paving asphalt to closely match or exceed performance of a paving asphalt modified by the addition of Trinidad Lake Asphalt, comprising natural tar sand and Gilsonite intimately mixed together in relative amounts by weight, with the Gilsonite being of character selected to effectively modify the characteristics of said tar sand, to thereby approximately simulate Trinidad Lake Asphalt, said composition containing additional tar-sand-extracted bitumen.

10. A method of producing an asphaltic composition having desired properties, comprising selecting a natural tar sand and selecting a grade of Gilsonite and mixing them in relative proportions effective to produce the desired properties for the resulting mixture; and reducing the size of particles in the mixture by crushing the resulting mixture, wherein bitumen is extracted from natural tar sand and is added to the tar sand and Gilsonite.

11. A method according to claim 10, wherein the tar sand and the Gilsonite are sized, respectively, such that stickiness of the tar sand will be obviated and Gilsonite dust will be alleviated.

12. A method according to claim 10, wherein the tar sand and Gilsonite are from Uintah County, Utah.

13. A method of producing an asphaltic composition having desired properties, comprising selecting a natural tar sand and selecting a grade of Gilsonite and mixing them in relative proportions effective to produce the desired properties for the resulting mixture; and reducing the size of particles in the mixture by crushing the resulting mixture, wherein the tar sand selected has a bitumen content of about 15% and an aggregate content of about 85%; the Gilsonite selected is of grade having a softening point within the range of about 270° F. to about 390° F.; about 45% by weight of the tar sand is mixed with about 55% by weight of the Gilsonite; and the mixture is crushed so that about 50 to 60% is retrieved by a 150 mesh screen.

14. A method according to claim 13 wherein the softening point of the Gilsonite is within the range of about 330° F. to about 360° F.

15. A method according to claim 13 wherein the softening point of the Gilsonite is about 340° F.

16. A method of extracting bitumen from a tar sand in a system comprising a solvent extraction column; continuously introducing a tar sand into the upper end portion of said solvent extraction column to provide a descending column of sand within said extraction column; maintaining a body of water in the lower end portion of said solvent extraction column; continuously injecting a bitumen solvent into the lower end portion of said descending column of sand above said body of water so as to establish an ascending column of said solvent flowing countercurrent to said descending column of sand; continuously withdrawing bitumen-carrying solvent from the upper end portion of said extraction column; continuously separating the solvent and the bitumen; continuously discharging and recovering the bitumen; and continuously discharging the sand and water from the lower end portion of said extraction column, wherein Gilsonite is introduced into the system to provide a Gilsonite-carrying bitumen for discharge from the system.

17. A method according to claim 16, wherein the Gilsonite is introduced into the system at the solvent and bitumen separating stage of the method.

* * * * *